US008983843B2

(12) United States Patent
Yoneyama et al.

(10) Patent No.: US 8,983,843 B2
(45) Date of Patent: Mar. 17, 2015

(54) MOTION ANALYZER HAVING VOICE ACQUISITION UNIT, VOICE ACQUISITION APPARATUS, MOTION ANALYSIS SYSTEM HAVING VOICE ACQUISITION UNIT, AND MOTION ANALYSIS METHOD WITH VOICE ACQUISITION

(75) Inventors: Hirohito Yoneyama, Kanagawa (JP); Kei Shimotani, Kanagawa (JP); Kiyoshi Iida, Kanagawa (JP); Yohei Nishino, Kanagawa (JP); Akira Fujii, Kanagawa (JP); Haruo Harada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 335 days.

(21) Appl. No.: 13/565,365

(22) Filed: Aug. 2, 2012

(65) Prior Publication Data

US 2013/0185076 A1    Jul. 18, 2013

(30) Foreign Application Priority Data

Jan. 12, 2012 (JP) ................................. 2012-003805

(51) Int. Cl.
*G06F 3/0346* (2013.01)

(52) U.S. Cl.
USPC .......................................................... 704/270

(58) Field of Classification Search
CPC ................................ G06F 3/01; G06F 3/0346
USPC ................................................. 704/275–277
See application file for complete search history.

(56) References Cited

U.S. PATENT DOCUMENTS

| 6,263,836 | B1 * | 7/2001 | Hollis ........................... 119/712 |
| 6,513,532 | B2 * | 2/2003 | Mault et al. .................... 600/595 |
| 6,549,792 | B1 * | 4/2003 | Cannon et al. .............. 455/550.1 |
| 6,956,564 | B1 * | 10/2005 | Williams ...................... 345/179 |
| 7,246,033 | B1 * | 7/2007 | Kudo ............................ 702/160 |
| 7,312,981 | B2 * | 12/2007 | Carroll ..................... 361/679.55 |
| 2001/0034250 | A1 * | 10/2001 | Chadha ......................... 455/566 |
| 2007/0136064 | A1 * | 6/2007 | Carroll .......................... 704/254 |
| 2009/0076827 | A1 * | 3/2009 | Bulitta et al. ................. 704/275 |
| 2009/0164219 | A1 * | 6/2009 | Yeung et al. .................. 704/258 |

FOREIGN PATENT DOCUMENTS

| JP | A-2000-338987 | 12/2000 |
| JP | A-2002-6874 | 1/2002 |
| JP | A-2002-149191 | 5/2002 |
| JP | A-2006-71936 | 3/2006 |

* cited by examiner

*Primary Examiner* — Michael N Opsasnick
(74) *Attorney, Agent, or Firm* — Oliff PLC

(57) ABSTRACT

A motion analyzer may include a motion detection unit, a speaking detection unit, and a determination unit. The motion detection unit may detect motion of a part of a body of a subject. The speaking detection unit may detect speaking of the subject. The determination unit may determine that the subject has performed predetermined motion when motion of a part of the body is detected by the motion detection unit and speaking of the subject is detected by the speaking detection unit.

10 Claims, 12 Drawing Sheets

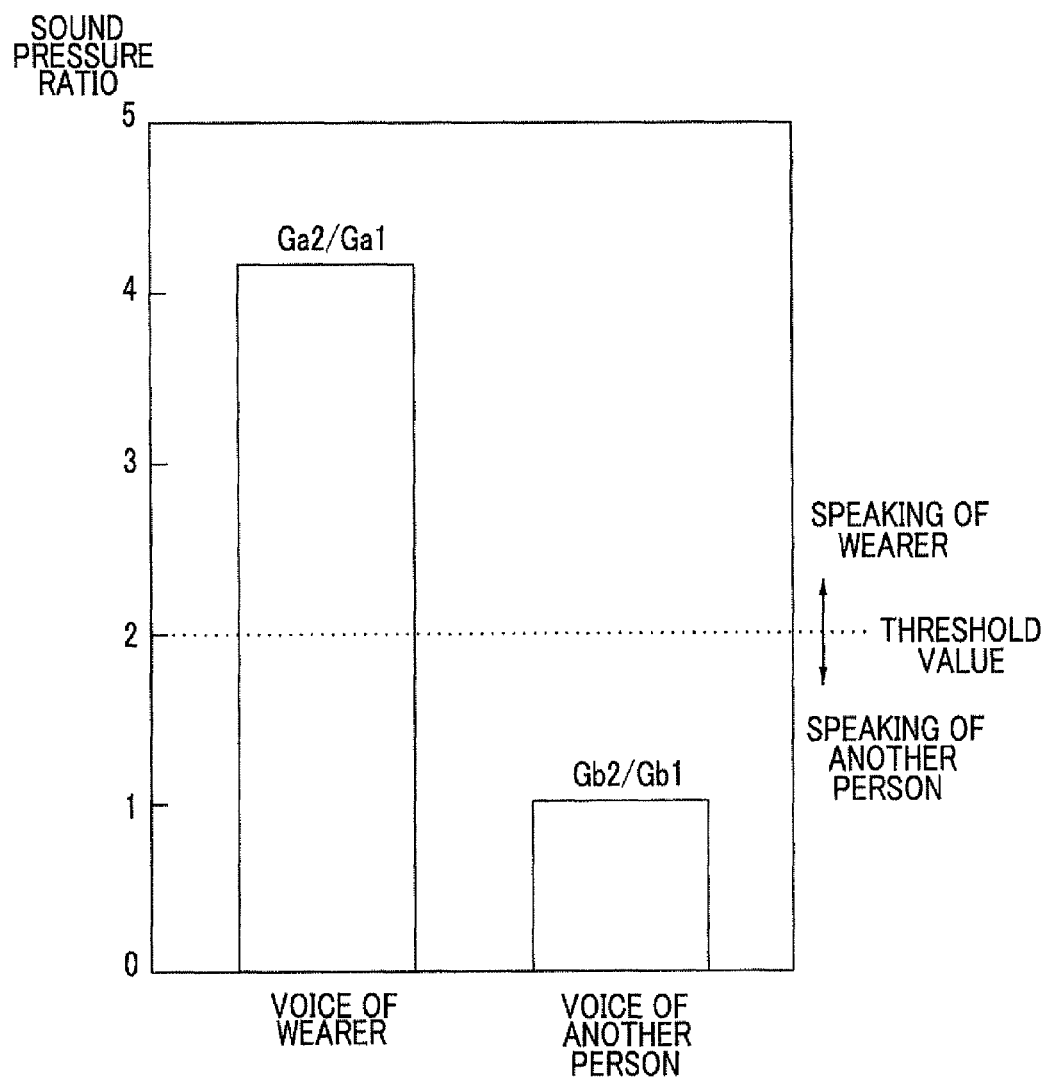

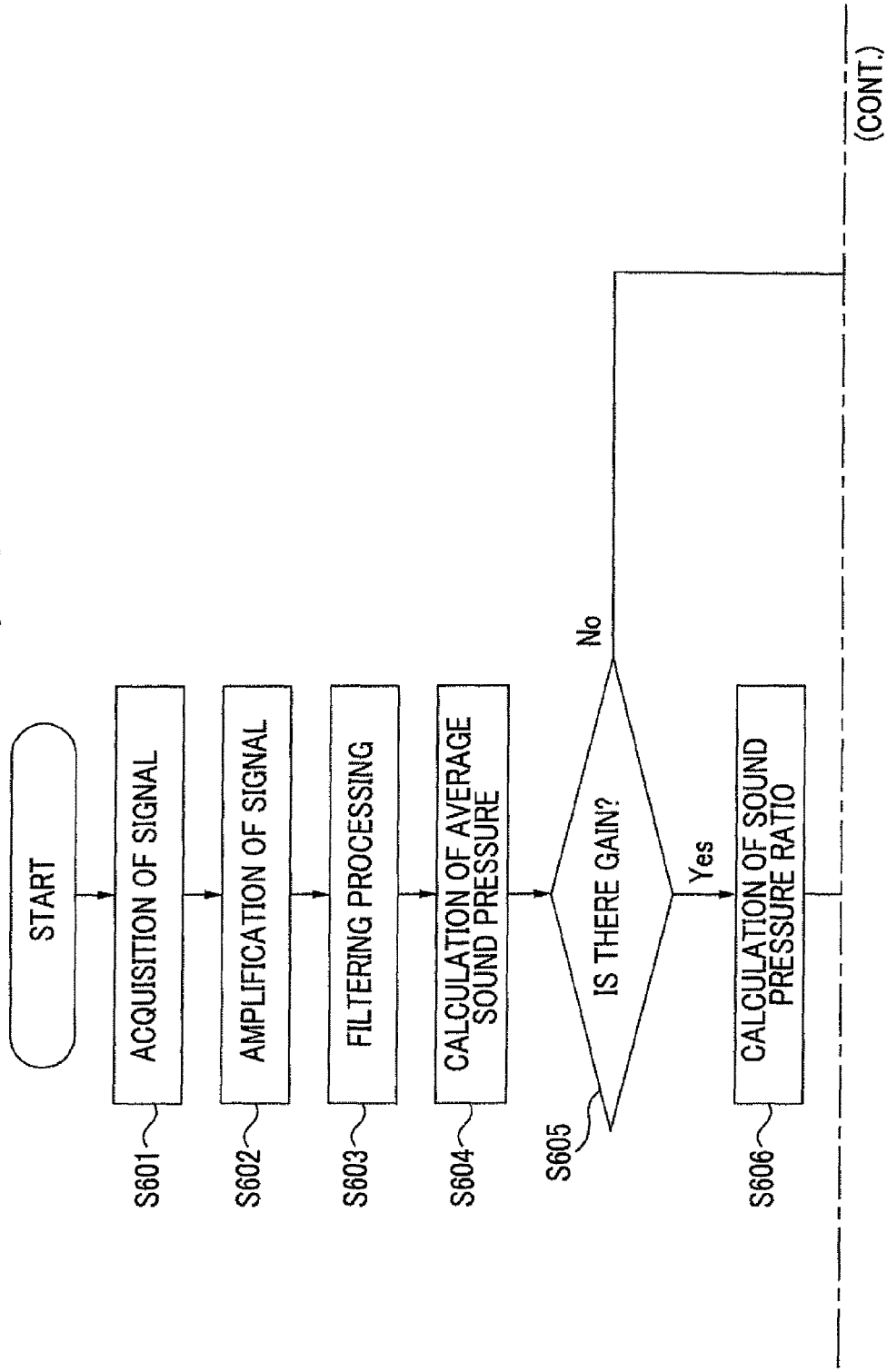

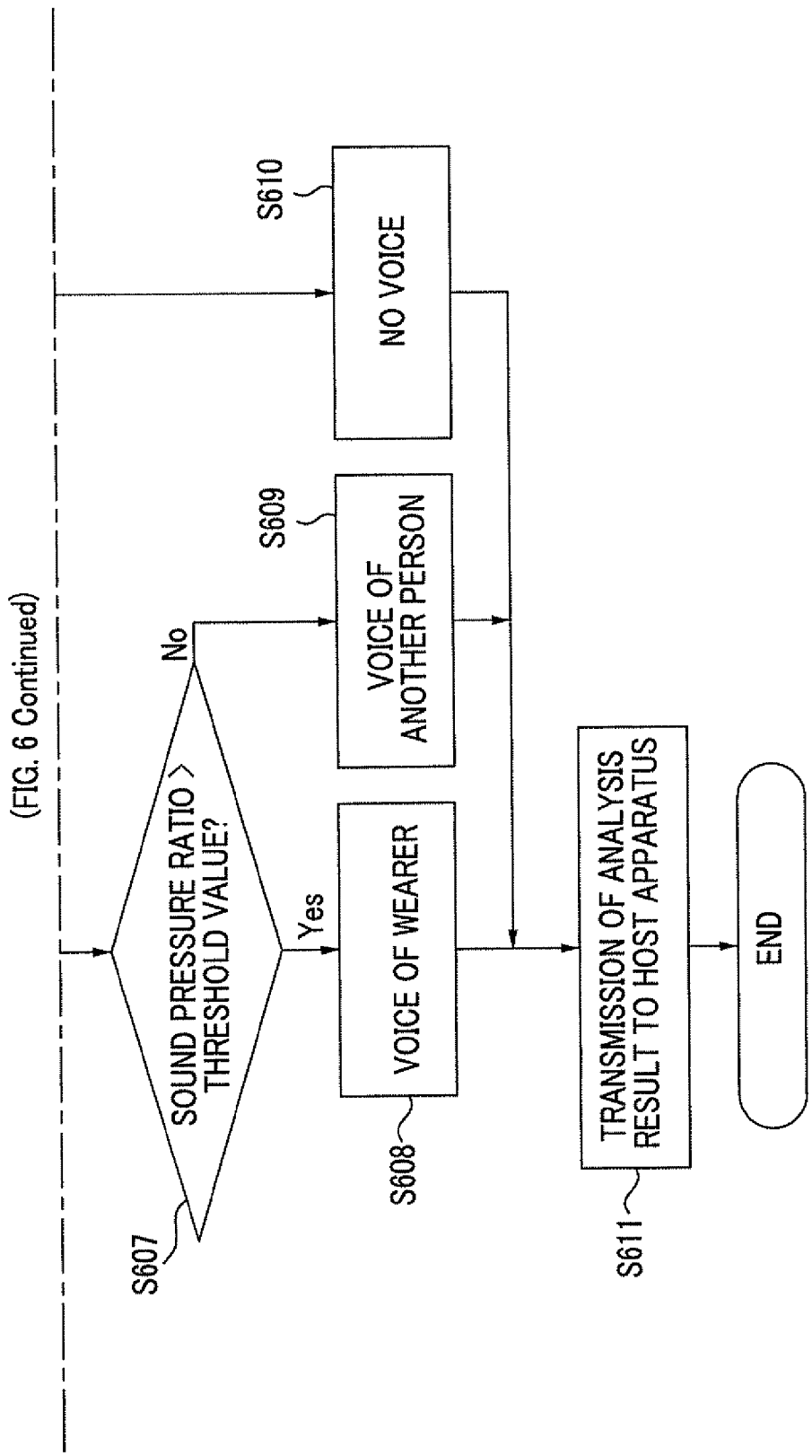

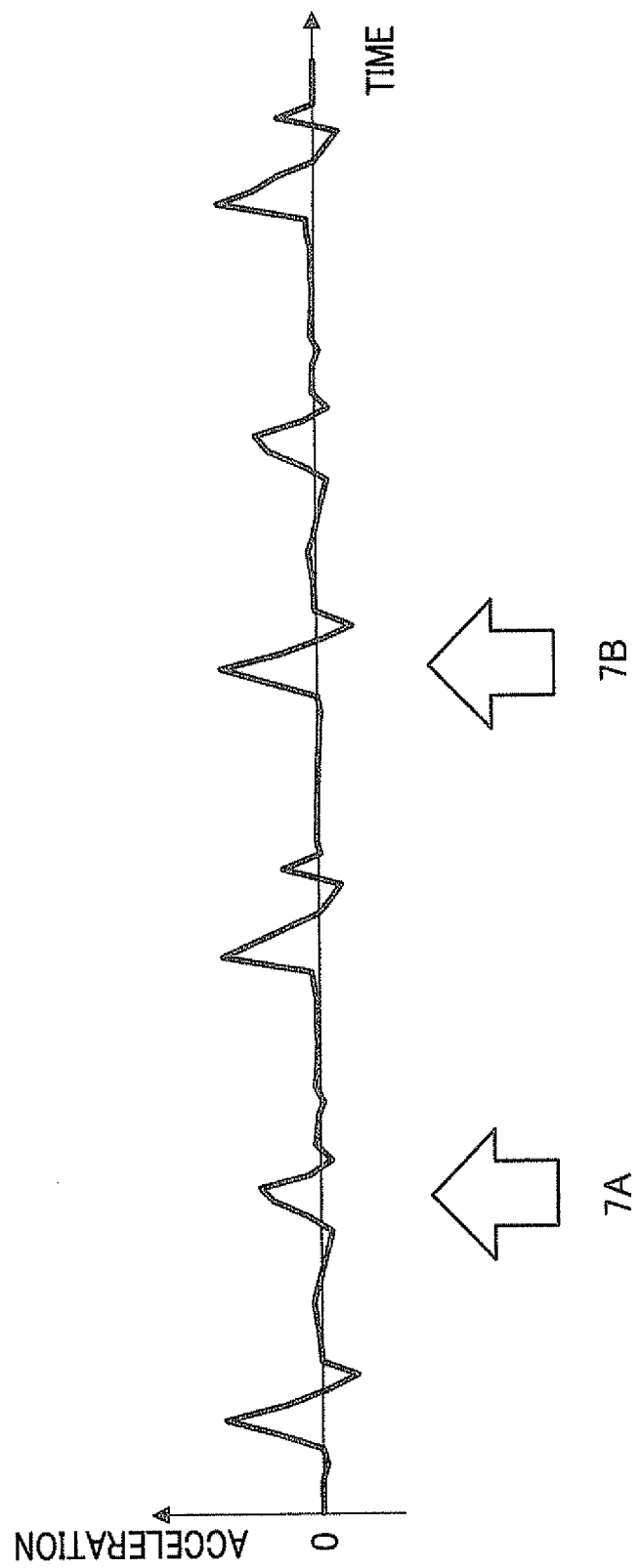

FIG. 10
ANALYSIS RESULT OF
TERMINAL APPARATUS 10A
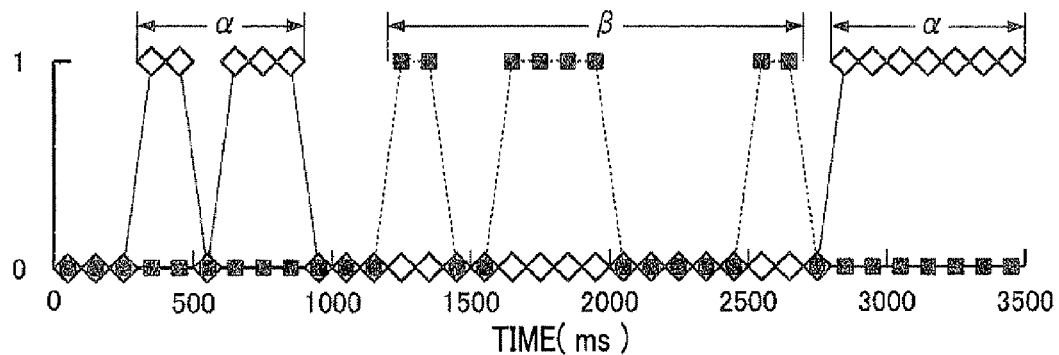
ANALYSIS RESULT OF
TERMINAL APPARATUS 10B
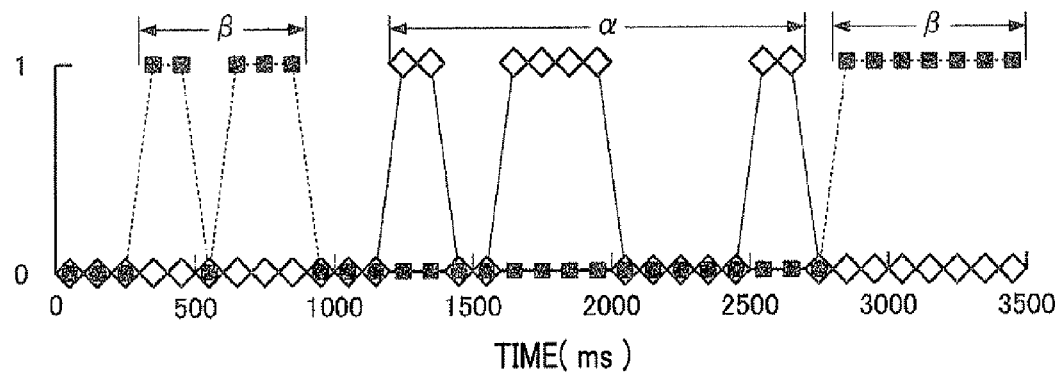
- ◇ VOICE OF WEARER
- ▬ VOICE OF ANOTHER PERSON
- α SPEAKING SECTION OF WEARER
- β SPEAKING SECTION OF ANOTHER PERSON

US 8,983,843 B2

MOTION ANALYZER HAVING VOICE ACQUISITION UNIT, VOICE ACQUISITION APPARATUS, MOTION ANALYSIS SYSTEM HAVING VOICE ACQUISITION UNIT, AND MOTION ANALYSIS METHOD WITH VOICE ACQUISITION

CROSS-REFERENCE TO RELATED APPLICATIONS

This application is based on and claims priority under 35 USC 119 from Japanese Patent Application No. 2012-003805 filed Jan. 12, 2012.

BACKGROUND

Technical Field

The present invention relates to a motion analyzer, a voice acquisition apparatus, a motion analysis system, and a motion analysis method.

SUMMARY

According to an aspect of the invention, there is provided a motion analyzer including: a motion detection unit that detects motion of a part of a body of a subject; a speaking detection unit that detects speaking of the subject; and a determination unit that determines that the subject has performed predetermined motion when motion of a part of the body is detected by the motion detection unit and speaking of the subject is detected by the speaking detection unit.

BRIEF DESCRIPTION OF THE DRAWINGS

Exemplary embodiments of the present invention will be described in detail based on the following figures, wherein:

FIG. 5 is a view showing a method of identifying a voice of a wearer and a voice of another person;

FIG. 6 is a flow chart showing the basic operation of a terminal apparatus;

FIG. 7 is a view showing an output from an acceleration sensor;

FIG. 10 is a view showing an example of the speaking information of each terminal apparatus in the conversation situation shown in FIG. 9.

DETAILED DESCRIPTION

Hereinafter, an exemplary embodiment of the invention will be described in detail with reference to the accompanying drawings.

Example of the System Configuration

Figure 1:
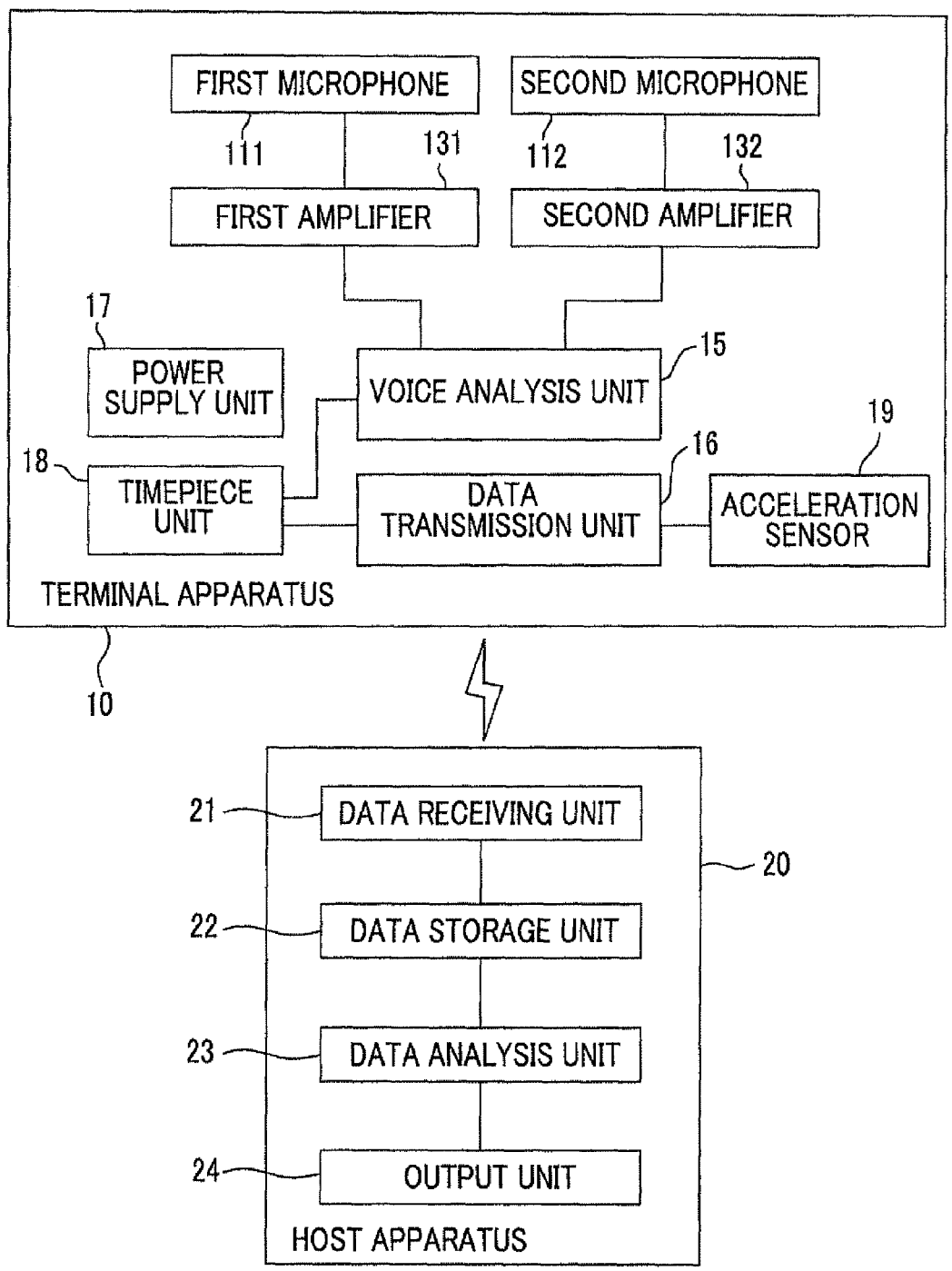
FIG. 1 is a view showing an example of the configuration of a motion analysis system.

FIG. 1 is a view showing an example of the configuration of a motion analysis system of the present exemplary embodiment.

As shown in FIG. 1, the system according to the present exemplary embodiment is configured to include a terminal apparatus 10 and a host apparatus 20. The terminal apparatus 10 and the host apparatus 20 are connected to each other through a radio communication line. As the radio communication line, lines based on the known methods, such as Wireless Fidelity (Wi-Fi) (registered trademark), Bluetooth (registered trademark), ZigBee (registered trademark), and Ultra Wideband (UWB), may be used. In addition, although only one terminal apparatus 10 is described in the example shown in FIG. 1, a number of terminal apparatuses 10 equal to the number of users are prepared in practice since the terminal apparatus 10 is used while worn by the user. This will be described in detail later. Hereinafter, the user who wears the terminal apparatus 10 is called a wearer.

The terminal apparatus 10 as an example of a voice acquisition apparatus includes at least two microphones (a first microphone 111 and a second microphone 112) and amplifiers (a first amplifier 131 and a second amplifier 132). In addition, the terminal apparatus 10 includes a voice analysis unit 15 that analyzes the recorded voice and a data transmission unit 16 that transmits an analysis result to the host apparatus 20, and further includes a power supply unit 17.

In addition, the terminal apparatus 10 includes a timepiece unit 18 and an acceleration sensor 19. Here, the timepiece unit 18 may be configured using a clock IC (Integrated Circuit), such as a real-time clock, and counts the passage of time and generates calendar information including current year, month, and date and time information (hereinafter, "calendar information and time information" is called "date information"). In addition, the timepiece unit 18 outputs the generated date information to the voice analysis unit 15 and the data transmission unit 16.

The first and second microphones 111 and 112 are disposed at different positions, at which distances of sound wave propagation paths from the mouth (speaking portion) of the wearer (hereinafter, simply referred to as "distances") are different.

Here, the first microphone 111 as an example of a first voice acquisition unit is disposed at the position (for example, about 35 cm) far from the mouth (speaking portion) of the wearer. In addition, the second microphone 112 as an example of a second voice acquisition unit is disposed at the position (for example, about 10 cm) near the mouth (speaking portion) of the wearer. In addition, various types of known microphones, such as a dynamic type microphone and a capacitor type microphone, may be used as the first and second microphones 111 and 112 in the present exemplary embodiment. In particular, it is preferable to use a non-directional MEMS (Micro Electro Mechanical Systems) type microphone.

The first and second amplifiers 131 and 132 amplify electric signals (voice signals) that the first and second microphones 111 and 112 output according to the acquired voice. Known operational amplifiers or the like may be used as the first and second amplifiers 131 and 132 in the present exemplary embodiment.

The voice analysis unit 15 analyzes the voice signals output from the first and second amplifiers 131 and 132. In addition, the voice analysis unit 15 identifies whether the voices acquired by the first and second microphones 111 and 112 are a voice from the wearer, who wears the terminal apparatus 10, or voices from others. That is, the voice analysis unit 15 functions as an identification unit that identifies a speaker of the voice on the basis of the voices acquired by the first and second microphones 111 and 112. Details of specific processing for identification of a speaker will be described later.

The data transmission unit 16 transmits the acquired data including the analysis result of the voice analysis unit 15, an ID of the terminal apparatus 10, the output from the acceleration sensor 19, and the date information generated by the timepiece unit 18 to the host apparatus 20 through the radio communication line. As the information transmitted to the host apparatus 20, for example, information regarding sound pressure of the acquired voice and the like may be included in addition to the analysis result according to processing performed in the host apparatus 20. In addition, the analysis result of the voice analysis unit 15 may be stored in the terminal apparatus 10, and data stored for a certain period of time may be collectively transmitted. In addition, the data may be transmitted through a cable line.

The power supply unit 17 supplies electric power to the first and second microphones 111 and 112, the first and second amplifiers 131 and 132, the voice analysis unit 15, the data transmission unit 16, the timepiece unit 18, and the acceleration sensor 19. As the power supply, it is possible to use known power supplies, such as a dry battery or a rechargeable battery, for example. In addition, the power supply unit 17 includes known circuits, such as a voltage conversion circuit and a charging control circuit, when necessary.

The host apparatus 20 includes a data receiving unit 21 that receives the data transmitted from the terminal apparatus 10, a data storage unit 22 that stores the received data, a data analysis unit 23 that analyzes the stored data, and an output unit 24 that outputs the analysis result. The host apparatus 20 is realized by an information processing apparatus, such as a personal computer, for example. Moreover, in the present exemplary embodiment, the plural terminal apparatuses 10 are used as described above, and the host apparatus 20 receives the data from each of the plural terminal apparatuses 10.

The data receiving unit 21 corresponds to the radio communication line described above, and receives the data from each terminal apparatus 10 and transmits the received data to the data storage unit 22. The data storage unit 22 is realized by a memory of a magnetic disk device of a personal computer, for example, and stores the received data acquired from the data receiving unit 21 for each speaker. Here, identification of a speaker is performed on the basis of a terminal ID transmitted from the terminal apparatus 10 and a combination of a speaker name and a terminal ID registered in the host apparatus 20 in advance. In addition, instead of the terminal ID, a wearer's name may be transmitted from the terminal apparatus 10.

The data analysis unit 23 is realized by a CPU program-controlled by a personal computer, for example, and analyzes the data stored in the data storage unit 22. As the specific analysis content and analysis method, various kinds of content and methods may be adopted depending on the purpose or aspect of use of the system according to the present exemplary embodiment. For example, the frequency of conversation between wearers of the terminal apparatuses 10 or the tendencies of a conversation partner of each wearer are analyzed, or the relationship between speakers in a conversation is estimated from the information regarding the length or sound pressure of the voice in the conversation.

The output unit 24 outputs the analysis result of the data analysis unit 23 or performs output based on the analysis result. As the output unit, various kinds of units including display of a display device, printout using a printer, and voice output may be adopted according to the purpose or aspect of use of the system, the content or format of an analysis result, and the like.

Example of the Configuration of a Terminal Apparatus

Figure 2:
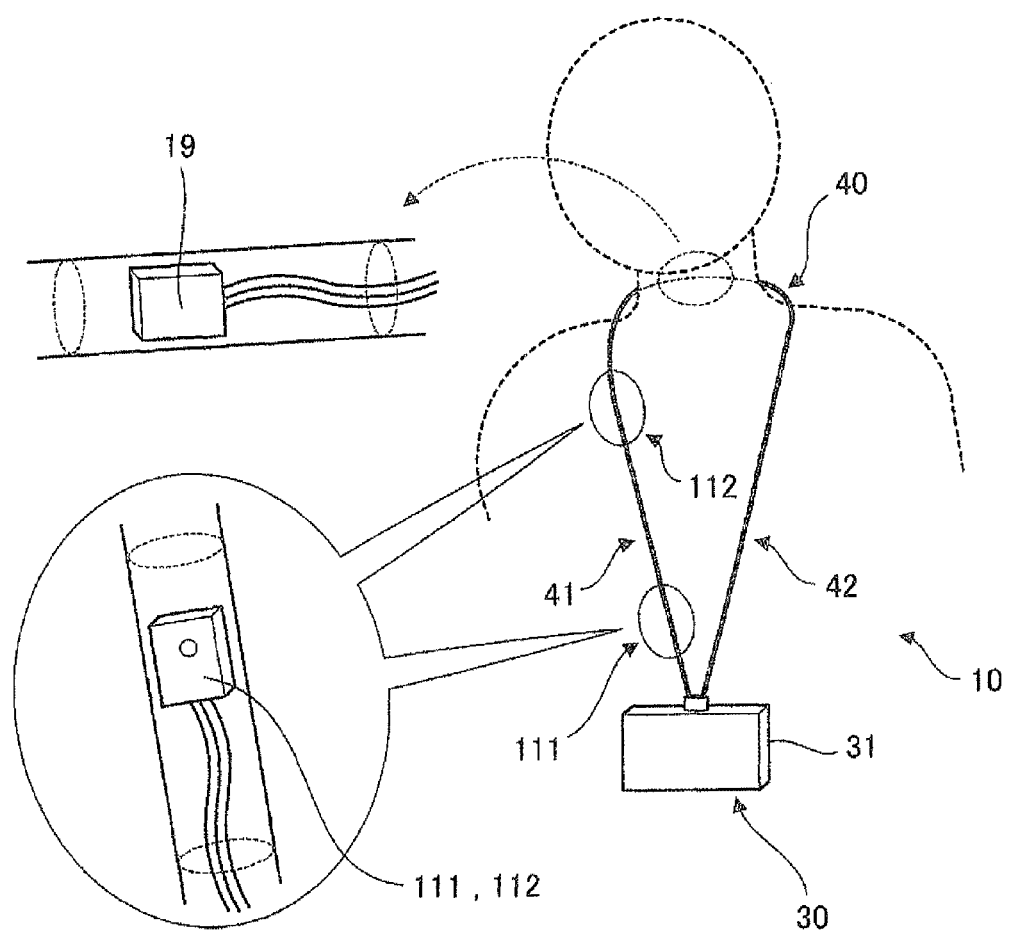
FIG. 2 is a view showing an example of the configuration of a terminal apparatus.

FIG. 2 is a view showing an example of the configuration of the terminal apparatus 10.

As described above, the terminal apparatus 10 is used in a state worn by each user. The terminal apparatus 10 in the present exemplary embodiment is configured to include an apparatus body 30 and a strap 40 connected to the apparatus body 30 so that the user may wear the terminal apparatus 10, as shown in FIG. 2. In the configuration shown in FIG. 2, the user wears the strap 40 on the neck so that the apparatus body 30 is hung from the neck.

The apparatus body 30 is configured such that at least circuits for realizing the first and second amplifiers 131 and 132, the voice analysis unit 15, the data transmission unit 16, the power supply unit 17, and the timepiece unit 18 and a power supply (battery) of the power supply unit 17 are housed in a rectangular parallelepiped thin case 31 formed of metal, resin, or the like. A pocket through which an ID card, on which ID information such as the name or affiliation of the wearer is displayed, is inserted may be provided in the case 31. In addition, such ID information or the like may be printed on the surface of the case 31, or a seal on which the ID information or the like is described may be attached to the surface of the case 31.

The first and second microphones 111 and 112 are provided in the strap 40 (hereinafter, referred to as microphones 111 and 112 when the first and second microphones 111 and 112 are not distinguished from each other). In addition, the acceleration sensor 19 functioning as a motion detection unit is provided in the strap 40. Here, the microphones 111 and 112 are connected to the first and second amplifiers 131 and 132 by cables (electric wires or the like) passing through the inside of the strap 40. In addition, the acceleration sensor 19 is connected to the data transmission unit 16 by cables (electric wires or the like) passing through the inside of the strap 40.

Here, as materials of the strap 40, it is possible to use various known materials, such as leather, synthetic leather, cotton, other natural fibers, synthetic fiber using resin, and metal. In addition, coating processing using silicon resin, fluorine resin, or the like may be performed. In addition, the strap 40 has a cylindrical structure, and the microphones 111 and 112 and the acceleration sensor 19 are housed inside the strap 40. Here, when the microphones 111 and 112 are provided inside the strap 40, it is possible to prevent damage or contamination of the microphones 111 and 112, and it is suppressed that a speaker in a conversation is aware of the existence of the microphones 111 and 112. In addition, the first microphone 111 disposed at the position far from the mouth (speaking portion) of the wearer may be provided in the apparatus body 30 so as to be housed in the case 31. In the present exemplary embodiment, a case where the first microphone 111 is provided in the strap 40 will be described as an example.

In addition, the microphones 111 and 112 are provided in portions of the strap 40 where the abdomen of the wearer is located. In addition, the acceleration sensor 19 is provided in a portion of the strap 40 on the back of the wearer side. More specifically, the acceleration sensor 19 is provided in a portion, which is located behind the neck of the wearer, of the strap 40.

In addition, the first microphone 111 is provided at the end (for example, a position within 10 cm from a connection portion) of the strap 40 connected to the apparatus body 30. Accordingly, the first microphone 111 is disposed at the position distant from the mouth (speaking portion) of the wearer by about 30 cm to 40 cm in a state where the wearer wears the strap 40 on the neck so that the apparatus body 30 is hung from the neck. In addition, also when the first microphone 111 is provided in the apparatus body 30, the distance from the mouth (speaking portion) of the wearer to the first microphone 111 is almost the same as above.

The second microphone 112 is provided at the position (for example, a position of about 20 cm to 30 cm from a connection portion) distant from the end of the strap 40 connected to the apparatus body 30. Accordingly, in a state where the wearer wears the strap 40 on the neck so that the apparatus body 30 is hung from the neck, the second microphone 112 is located on the neck (for example, a position equivalent to the collarbone) of the wearer and is disposed at the position distant from the mouth (speaking portion) of the wearer by about 10 cm to 20 cm.

More specifically, in the present exemplary embodiment, the strap 40 formed in an annular shape is hung on the neck of the wearer, and this strap 40 is pulled downward by the apparatus body 30. As a result, a first portion 41, which starts from a portion connected to the apparatus body 30 and extends toward the back of the neck of the wearer through the right shoulder side of the wearer, and a second portion 42, which starts from a portion connected to the apparatus body 30 and extends toward the back of the neck of the wearer through the left shoulder side of the wearer, are provided in the strap 40. In addition, in the present exemplary embodiment, the first and second microphones 111 and 112 are attached to the first portion 41. In addition, the first microphone 111 may be provided in one of the first and second portions 41 and 42, and the second microphone 112 may be provided in the other portion of the first and second portions 41 and 42.

Here, the microphones 111 and 112 and the acceleration sensor 19 are not limited to being provided in the strap 40, and may be worn on the wearer by various methods. For example, each of the first and second microphones 111 and 112 and the acceleration sensor 19 may be separately fixed to clothes using a pin or the like. In addition, it is also possible to prepare a dedicated mounting fixture designed so that each of the first and second microphones 111 and 112 and the acceleration sensor 19 is fixed at a desired position.

In addition, the configuration of the apparatus body 30 is not limited to the configuration shown in FIG. 2 in which the apparatus body 30 is connected to the strap 40 so as to be hung from the neck of the wearer, and the apparatus body 30 may be formed as a device which may be easily carried. For example, the apparatus body 30 may be mounted on clothes or the body using a clip or a belt instead of the strap in the present exemplary embodiment, or the apparatus body 30 may simply be carried in a pocket or the like.

In addition, mobile phones or known portable electronic information terminals may be configured to realize a function of receiving a voice signal from the microphones 111 and 112 and amplifying and analyzing the voice signal. Here, when the first microphone 111 is provided in the apparatus body 30, it is necessary to maintain the positional relationship between the first and second microphones 111 and 112 as described above. Accordingly, the position of the apparatus body 30 at the time of carrying is specified.

In addition, the microphones 111 and 112 and the apparatus body 30 (or the voice analysis unit 15) may be wirelessly connected to each other instead of being connected using a cable. Similarly, the acceleration sensor 19 and the apparatus body 30 (or the data transmission unit 16) may be connected to each other through radio communication instead of being connected using a cable. In addition, although the first and second amplifiers 131 and 132, the voice analysis unit 15, the data transmission unit 16, the power supply unit 17, and the timepiece unit 18 are housed in the single case 31 in the above example of the configuration, they may be grouped into plural parts. For example, the power supply unit 17 may be connected to an external power supply without being housed in the case 31.

<Identification of a Speaker (Wearer and Others) Based on Non-Linguistic Information of Recorded Voice>

Next, a method of identifying a speaker in the present exemplary embodiment will be described.

In the present exemplary embodiment, it is identified whether the speaker of the recorded voice is the wearer or not. In addition, in the present exemplary embodiment, speaker identification is performed on the basis of non-linguistic information, such as sound pressure (volume input to the microphones 111 and 112), instead of linguistic information acquired using morphological analysis or dictionary information, among information items of the recorded voice. That is, a speaker of the voice is identified from the speaking situation specified by the non-linguistic information instead of the content of speaking specified by the linguistic information.

As described with reference to FIGS. 1 and 2, in the present exemplary embodiment, the first microphone 111 of the terminal apparatus 10 is disposed at the position far from the mouth (speaking portion) of the wearer and the second microphone 112 is disposed at the position near the mouth (speaking portion) of the wearer. That is, assuming that the mouth (speaking portion) of the wearer is a sound source, the distance between the first microphone 111 and the sound source is greatly different from the distance between the second microphone 112 and the sound source.

Specifically, the distance between the first microphone 111 and the sound source is about 1.5 to 4 times the distance between the second microphone 112 and the sound source. Here, sound pressure of the recorded voice in each of the microphones 111 and 112 decreases (distance-decreases) as the distance between each of the microphones 111 and 112 and the sound source increases. Therefore, for the voice of the wearer, the sound pressure of the recorded voice in the first microphone 111 is greatly different from the sound pressure of the recorded voice in the second microphone 112.

On the other hand, assuming that the mouth (speaking portion) of a person other than the wearer (another person) is a sound source, the distance between the first microphone 111 and the sound source and the distance between the second microphone 112 and the sound source do not change greatly since the other person is away from the wearer. Although there may be a difference between both the distances depending on the position of another person with respect to the wearer, the distance between the first microphone 111 and the sound source is not several times the distance between the second microphone 112 and the sound source unlike the case when the mouth (speaking portion) of the wearer is a sound source. Therefore, for the voice of another person, the sound pressure of the recorded voice in the first microphone 111 is not largely different from the sound pressure of the recorded voice in the second microphone 112 unlike the case of the voice of the wearer.

Figure 3:
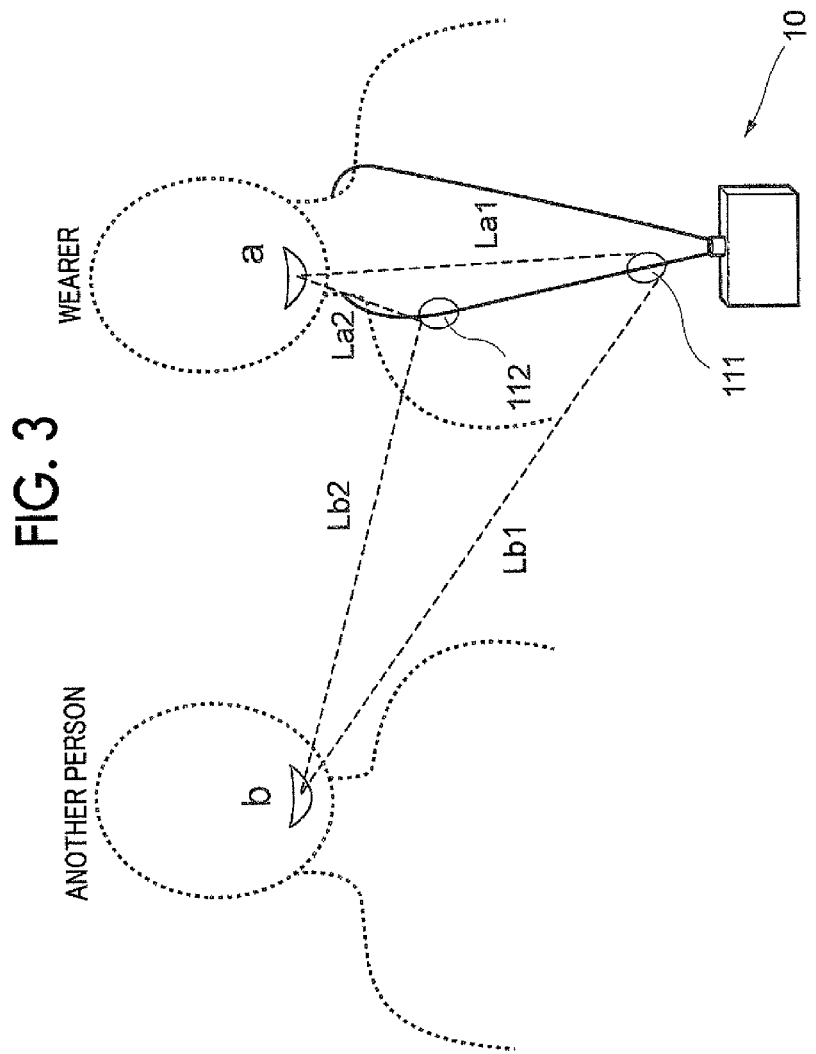
FIG. 3 is a view showing a positional relationship between mouths (speaking portions) of a wearer and another person and a microphone.

FIG. 3 is a view showing the positional relationship between mouths (speaking portions) of a wearer and another person and the microphones 111 and 112.

In the relationship shown in FIG. 3, the distance between a sound source a, which is a mouth (speaking portion) of the wearer, and the first microphone 111 is La1, and the distance between the sound source a and the second microphone 112 is La2. In addition, the distance between a sound source b, which is a mouth (speaking portion) of another person, and the first microphone 111 is Lb1, and the distance between the sound source b and the second microphone 112 is Lb2. In this case, the following relationship is satisfied.

$$La1 > La2 (La1 \cong 1.5 \times La2 \text{ to } 4 \times La2)$$

$$Lb1 \cong Lb2$$

Figure 4:
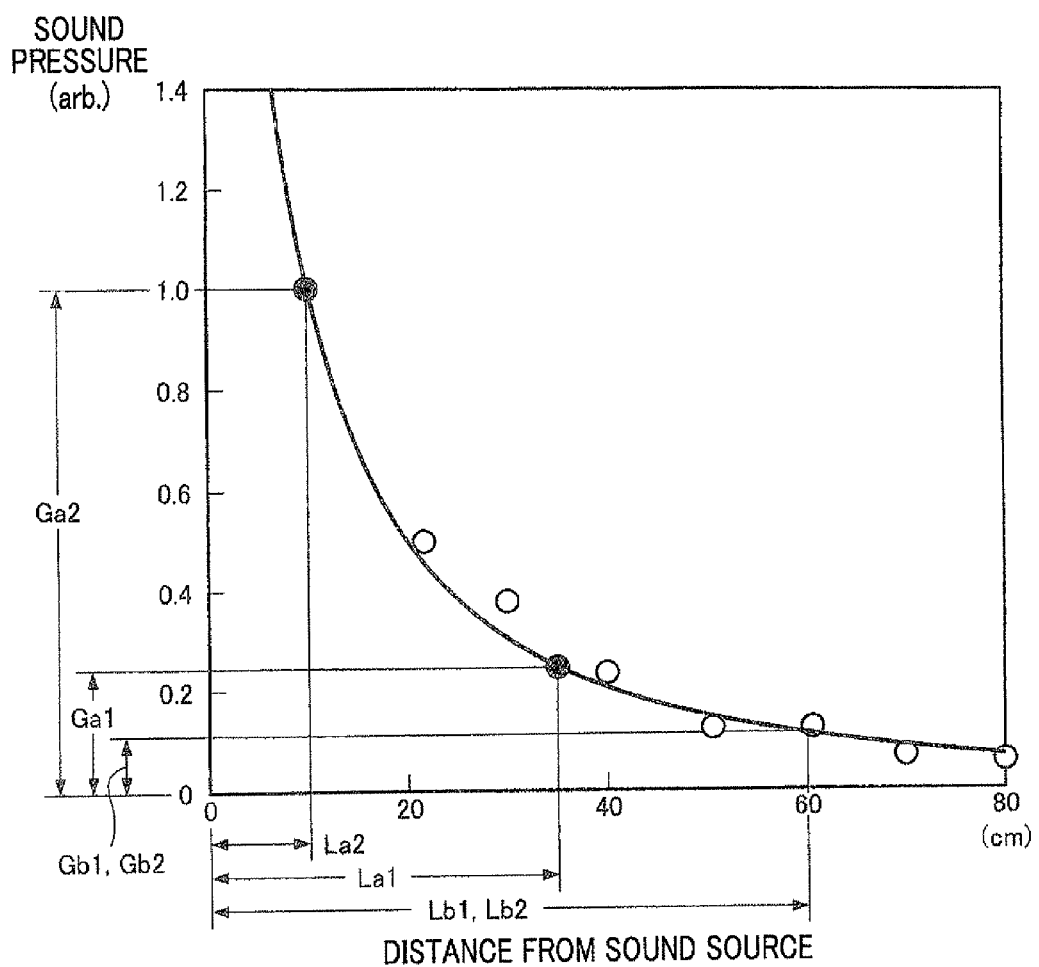
FIG. 4 is a view showing a relationship of sound pressure (input volume) and a distance between a microphone and a sound source.

FIG. 4 is a view showing the relationship of the distance between each of the microphones 111 and 112 and the sound source and the sound pressure (input volume)

As described above, the sound pressure distance-decreases with the distance between each of the microphones 111 and 112 and the sound source. In FIG. 4, when sound pressure Ga1 in the case of the distance La1 is compared with sound pressure Ga2 in the case of the distance La2, the sound pressure Ga2 is about 4 times the sound pressure Ga1. On the other hand, since the distances Lb1 and Lb2 are approximately equal, sound pressure Gb1 in the case of the distance Lb1 and sound pressure Gb2 in the case of the distance Lb2 are almost equal.

In the present exemplary embodiment, therefore, a voice of the wearer and voices of others in the recorded voices are identified using the difference in sound pressure ratio. In addition, although the distances Lb1 and Lb2 are 60 cm in the example shown in FIG. 4, it is meaningful that the sound pressure Gb1 and the sound pressure Gb2 are almost equal, and the distance Lb1 and Lb2 are not limited to the values shown in FIG. 4.

FIG. 5 is a view showing a method of identifying a voice of a wearer and a voice of another person.

As described with reference to FIG. 4, for the voice of the wearer, the sound pressure Ga2 of the second microphone 112 is several times (for example, about 4 times) the sound pressure Ga1 of the first microphone 111. In addition, for the voice of another person, the sound pressure Gb2 of the second microphone 112 is almost equal to (about 1 times) the sound pressure Gb1 of the first microphone 111.

In the present exemplary embodiment, therefore, a threshold value of the ratio between the sound pressure of the second microphone 112 and the sound pressure of the first microphone 111 is set. In addition, a voice with a larger sound pressure ratio than the threshold value is determined to be the voice of the wearer, and a voice with a smaller sound pressure ratio than the threshold value is determined to be the voice of another person. In the example shown in FIG. 5, the threshold value is 2. Since the sound pressure ratio Ga2/Ga1 exceeds the threshold value 2, the voice is determined to be the voice of the wearer. In addition, since the sound pressure ratio Gb2/Gb1 is smaller than the threshold value 2, the voice is determined to be the voice of another person.

Incidentally, not only the voice but also so-called noise, such as environmental sounds, is included in the voice recorded by the microphones 111 and 112. The relationship of the distance between the sound source of noise and each of the microphones 111 and 112 is similar to that in the case of voices of others. That is, according to the example shown in FIGS. 4 and 5, assuming that the distance between a sound source c of noise and the first microphone 111 is Lc1 and the distance between the sound source c of noise and the second microphone 112 is Lc2, the distances Lc1 and Lc2 are approximately equal. In addition, the sound pressure ratio Gc2/Gc1 in recorded voices of the microphones 111 and 112 is smaller than the threshold value 2. However, such noise is separated and removed from the voice by performing filtering based on the known technique using a band pass filter, a gain filter, or the like.

Example of an Operation of a Terminal Apparatus

FIG. 6 is a flow chart showing the basic operation of the terminal apparatus 10.

As shown in FIG. 6, when the microphones 111 and 112 of the terminal apparatus 10 acquire voices, electric signals (voice signals) corresponding to the acquired voices are transmitted from the microphones 111 and 112 to the first and second amplifiers 131 and 132, respectively (step 601). When the voice signals from the microphones 111 and 112 are acquired, the first and second amplifiers 131 and 132 amplify the signals and transmit the amplified signals to the voice analysis unit 15 (step 602).

The voice analysis unit 15 receives the signals amplified by the first and second amplifiers 131 and 132 and also performs filtering processing on the received signals to remove noise components, such as environmental sounds, from the signals (step 603). Then, the voice analysis unit 15 calculates the average sound pressure in the recorded voice of each of the microphones 111 and 112 for the signals, from which noise components are removed, every fixed time unit (for example, few tenths of a second to few hundredths of a second) (step 604).

Then, when there is a gain of the average sound pressure in each of the microphones 111 and 112 calculated in step 604 (Yes in step 605), the voice analysis unit 15 determines that there is a voice (speaking has been done). Then, the voice analysis unit 15 calculates the ratio (sound pressure ratio) between the average sound pressure in the first microphone 111 and the average sound pressure in the second microphone 112 (step 606). Then, when the sound pressure ratio calculated in step 606 is larger than the threshold value (Yes in step 607), the voice analysis unit 15 that functions as a voice detection unit determines that the voice is from the wearer (step 608), and detects the speaking of the wearer. In addition, when the sound pressure ratio calculated in step 606 is smaller than the threshold value (No in step 607), the voice analysis unit 15 determines that the voice is from another person (step 609).

On the other hand, when there is no gain of the average sound pressure in each of the microphones 111 and 112 calculated in step 604 (No in step 605), the voice analysis unit 15 determines that there is no voice (speaking has not been performed) (step 610). In addition, regarding the determination in step 605, it may be determined that there is a gain when the value of the gain of average sound pressure is equal to or larger than the predetermined value, in consideration of a case where noise which is not removed by filtering processing in step 603 remains in signals.

Then, the data transmission unit 16 transmits the information obtained by the processing in steps 604 to 610, as an analysis result, to the host apparatus 20 (step 611). Specifically, the data transmission unit 16 transmits to the host apparatus 20 information regarding whether or not there has been speaking of the wearer, information of date and time of speaking of the wearer when the wearer has spoken, information regarding whether or not there has been speaking of a person other than the wearer (others), information of date and time of speaking of others when a person other than the wearer (others) has spoken, and the like. In addition, the date and time of speaking of the wearer and the date and time of speaking of others are checked by the voice analysis unit 15 on the basis of the date information from the timepiece unit 18, the outputs from the microphones 111 and 112, and the determination result of steps 608 to 610. In addition, not only these information items but also the length of speaking time of each speaker (wearer or another person), the value of the gain of average sound pressure, and other additional information items may be transmitted to the host apparatus 20 together with the analysis result.

In addition, although the explanation is omitted, the data transmission unit 16 also transmits the output of the acceleration sensor 19 to the host apparatus 20 when necessary, so that the detection result of the acceleration sensor 19 is acquired by the host apparatus 20. In addition, in transmitting the output of the acceleration sensor 19 to the host apparatus 20, the data transmission unit 16 also transmits the date information generated by the timepiece unit 18 together. In addition, in the present exemplary embodiment, the data storage unit 22 of the host apparatus 20 stores the output from the acceleration sensor 19 and this date information so as to match each other.

In addition, in the present exemplary embodiment, determination regarding whether the voice is a voice from the wearer or a voice from another person is performed by comparing the sound pressure of the first microphone 111 with the sound pressure of the second microphone 112. In the present exemplary embodiment, any kind of speaker identification may be performed if it is performed on the basis of the non-linguistic information extracted from the voice signals themselves acquired by the microphones 111 and 112, without being limited to the comparison of sound pressure.

For example, it is also possible to compare the voice acquisition time (output time of a voice signal) in the first microphone 111 with the voice acquisition time in the second microphone 112. In this case, since there is a large difference between the distance from the mouth (speaking portion) of the wearer to the first microphone 111 and the distance from the mouth (speaking portion) of the wearer to the second microphone 112, a difference (time difference) in voice acquisition time occurs to some extent for the voice of the wearer.

On the other hand, since there is a small difference between the distance from the mouth (speaking portion) to the first microphone 111 and the distance from the mouth (speaking portion) to the second microphone 112, a difference in voice acquisition time for the voice of another person is smaller than that in the case of the voice of the wearer. Therefore, it is possible to set a threshold value of the time difference in voice acquisition time and to determine that the voice is from the wearer when the time difference in voice acquisition time is larger than the threshold value and determine that the voice is from another person when the time difference in voice acquisition time is smaller than the threshold value.

Application Example of a System and Functions of a Host Apparatus

In the system according to the present exemplary embodiment, information regarding speaking (hereinafter, referred to as speaking information) obtained as described above by the plural terminal apparatuses 10 are collected in the host apparatus 20. In addition, using the information acquired from the terminal apparatus 10, the host apparatus 20 performs various kinds of processing according to the purpose or aspect of use of the system. For example, the host apparatus 20 (data analysis unit 23 of the host apparatus 20) analyzes the information acquired from the terminal apparatus 10 and determines whether or not the wearer has made a "nodding" motion which is to shake the head back and forth.

Here, in people's conversation, when an affirmative answer or the like is made, the head and neck are shaken back and forth to make a "nodding" motion in many cases. In the system according to the present exemplary embodiment, the acceleration sensor 19 is located behind the wearer's neck, and the "nodding" motion may be detected using the output from the acceleration sensor 19. More specifically, in the present exemplary embodiment, not only the identification of a speaker but also detection regarding whether or not a wearer has made an affirmative answer may be performed.

However, similar motions to the motion made at the time of "nodding" are made in many cases by the wearer. When the "nodding" motion is detected only on the basis of the output from the acceleration sensor 19, incorrect detection easily occurs. This will be described in detail with reference to FIG. 7 which shows the output from the acceleration sensor 19. In FIG. 7, even though the "nodding" motion is made in practice only in places indicated by the reference numerals 7A and 7B, the same output as the output (signal waveform) detected at the time of "nodding" motion is observed in places other than the places indicated by the reference numerals 7A and 7B.

In the present exemplary embodiment, in order to improve the detection accuracy of the "nodding" motion, not only the output from the acceleration sensor 19 but also speaking information of the wearer is used. More specifically, in the present exemplary embodiment, when there is wearer's speaking and there is an output from the acceleration sensor 19 which satisfies the predetermined conditions, it is determined that there is a "nodding" motion.

Figure 8:
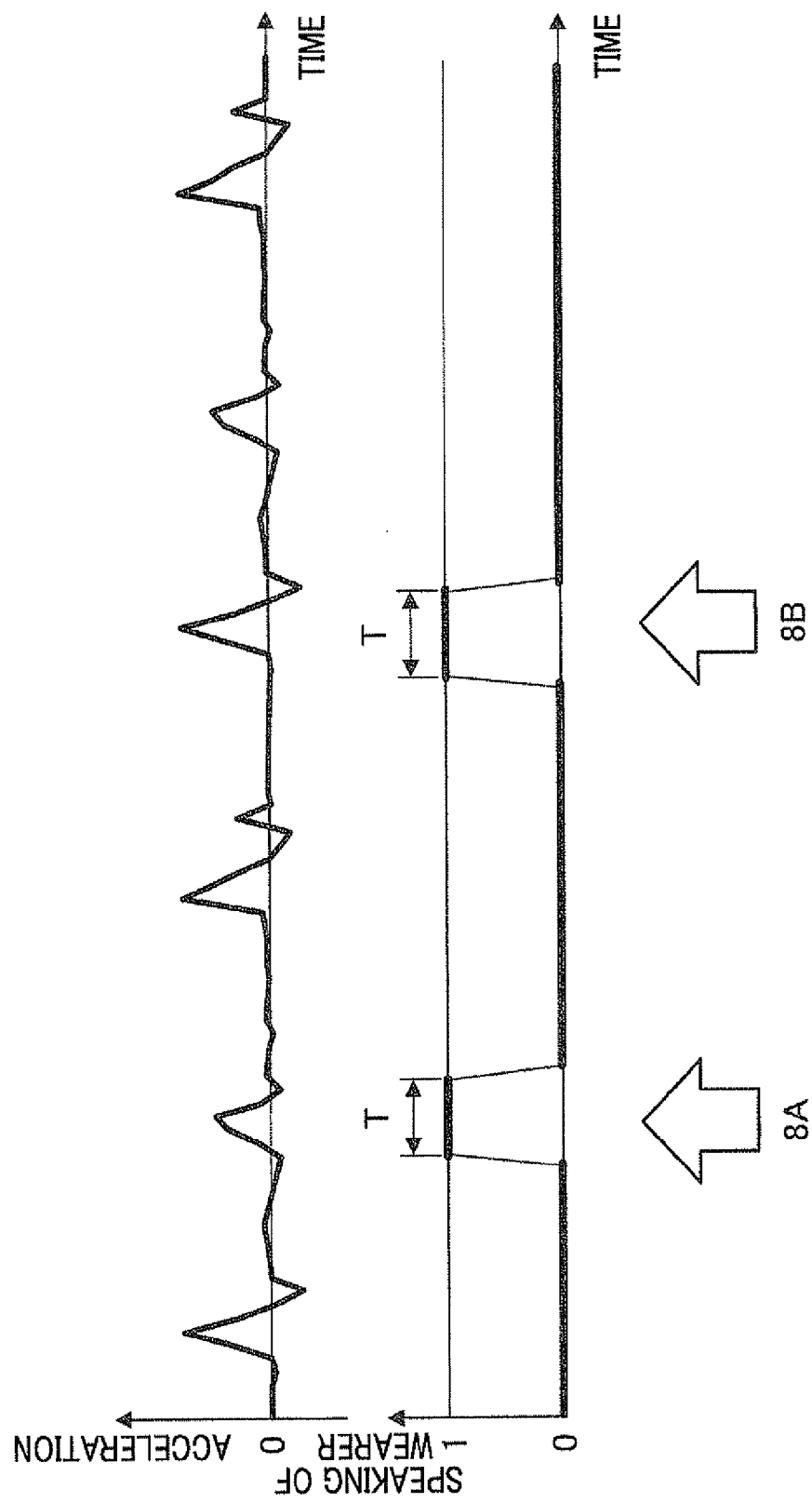
FIG. 8 is a view showing an output of an acceleration sensor when a wearer is in a conversation and the speaking information of the wearer.

FIG. 8 is a view showing an output of the acceleration sensor 19 when a wearer is in a conversation and the speaking information of the wearer. In addition, in FIG. 8, "nodding" of the wearer is actually performed in places indicated by the reference numerals 8A and 8B.

Here, as shown in FIG. 8, wearer's speaking is detected in the places where the "nodding" is actually performed. On the other hand, when motions other than "nodding" motion (in places other than the places indicated by the reference numerals 8A and 8B) are made, wearer's speaking is not detected. For this reason, if determination that there has been a "nodding" motion is made when there is wearer's speaking and there is an output from the acceleration sensor 19 which satisfies the predetermined conditions, the accuracy of determination regarding whether or not there has been "nodding" is improved.

Here, the process of determining whether or not there has been a "nodding" motion will be specifically described. In the present exemplary embodiment, when determining whether or not a "nodding" motion has been made, the data analysis unit analyzes the output of the acceleration sensor 19 transmitted from the terminal apparatus 10 first and determines whether or not a signal waveform (output) satisfying the predetermined conditions is included in the output of the acceleration sensor 19. In addition, when it is determined that the signal waveform satisfying the predetermined conditions is included in the output of the acceleration sensor 19, time information (date information) when the signal waveform is output is checked.

In addition, the data analysis unit 23 checks the date and time of wearer's speaking when the wearer has spoken on the basis of the information transmitted from the terminal apparatus 10. In addition, the data analysis unit 23 determines that a "nodding" motion has been made by the wearer when the time interval between the date and time when the signal waveform satisfying the predetermined conditions is output and the date and time specified by the above date and time of wearer's speaking is smaller than the predetermined time interval. On the other hand, when the time interval between the date and time when the signal waveform satisfying the predetermined conditions is output and the date and time specified by the above date and time of wearer's speaking is larger than the predetermined time interval, the data analysis unit 23 determines that no "nodding" motion has been made by the wearer.

In addition, determination regarding whether or not a "nodding" motion has been made may be made by performing video photographing of persons in a conversation and by observing the video image after photographing, for example. In this case, however, it is necessary to construct a large-scale system. In the present exemplary embodiment, the determination regarding whether or not "nodding" has been made is realized with a simple configuration.

In addition, although the case where the determination regarding whether or not a "nodding" motion has been made is performed by the host apparatus 20 has been described above, the determination regarding whether or not a "nodding" motion has been made may also be performed by the terminal apparatus 10. In addition, although the acceleration sensor 19 is disposed so as to be located behind the neck in the above explanation, the acceleration sensor 19 may also be provided in other locations, such as the back of the head, as long as the location is a place linked to the swing of the wearer's neck (movement of the wearer's head). In addition, although the case where the acceleration sensor 19 is attached to the strap 40 has been described above, the acceleration sensor 19 may also be provided in a hat, an earphone, a headphone, or the like.

In addition, although the case of detecting the "nodding" motion performed when giving an affirmative answer to the question has been described as an example, for example, a swing (swing in the left and right direction) motion performed when giving a negative answer to the question may also be detected by the same process as described above. In addition, when the swing in the left and right direction is performed, a different signal from the signal described above is output from the acceleration sensor 19. Moreover, in this case, it is determined that there has been a swing according to the negative answer when the different signal is output and there is a wearer's speaking.

Alternatively, when there is wearer's speaking for a shorter time than the predetermined time and a signal (output) satisfying the predetermined conditions has been output from the acceleration sensor 19, it may be determined that there is a "nodding" motion. More specifically, when a time indicated by the reference numeral T in FIG. 8 (period for which wearer's speaking continues) is shorter than the predetermined time and a signal satisfying the predetermined conditions has been output from the acceleration sensor 19, it may be determined that there is a "nodding" motion. This is because speaking made with a "nodding" motion ends in a short time in many cases and accordingly, a possibility of speaking made at the time of motion other than the "nodding" motion is high when the speaking time is long.

Hereinafter, an example will be described in which the system according to the present exemplary embodiment is used as a system that acquires the information regarding communication of plural wearers.

Figure 9:
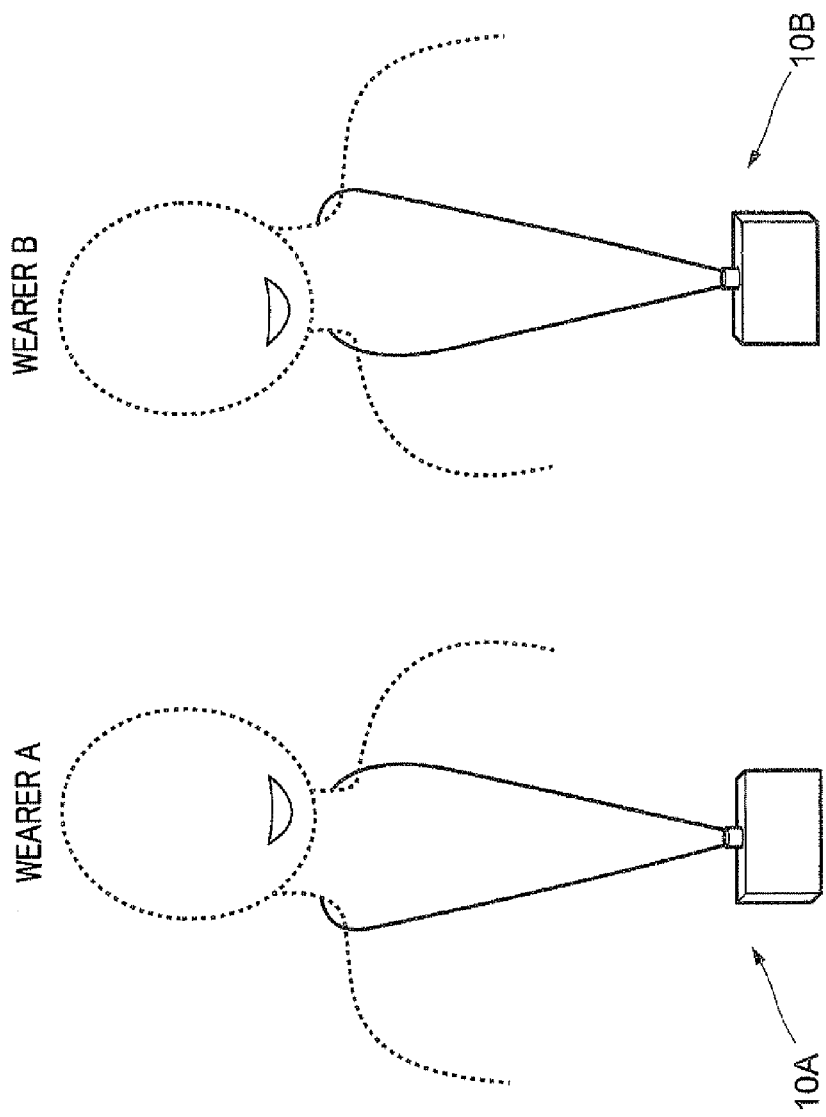
FIG. 9 is a view showing a situation where plural wearers who wear the terminal apparatus according to the exemplary embodiment have a conversation with each other.

FIG. 9 is a view showing a situation where plural wearers who wear the terminal apparatuses 10 according to the present exemplary embodiment have a conversation with each other. FIG. 10 is a view showing an example of the speaking information of terminal apparatuses 10A and 10B in the conversation situation shown in FIG. 9.

As shown in FIG. 9, a case is considered in which two wearers A and B each of whom wears the terminal apparatus 10 have a conversation with each other. In this case, a voice recognized as wearer's speaking in the terminal apparatus 10A of the wearer A is recognized as another person's speaking in the terminal apparatus 10B of the wearer B. On the contrary, a voice recognized as wearer's speaking in the terminal apparatus 10B is recognized as another person's speaking in the terminal apparatus 10A.

The speaking information is separately transmitted from the terminal apparatuses 10A and 10B to the host apparatus 20. In this case, identification results of speakers (wearer and another person) in the speaking information acquired from the terminal apparatus 10A and the speaking information acquired from the terminal apparatus 10B are opposite as shown in FIG. 10, but the information showing the speaking situation, such as the length of speaking time or the speaker change timing, is similar.

Therefore, the host apparatus 20 in this application example determines that such information items indicate the same speaking situation by comparing the information acquired from the terminal apparatus 10A with the information acquired from the terminal apparatus 10B, and recognizes that the wearers A and B have a conversation. Here, at least the time information regarding the speaking, such as the length of speaking time in each speaking of each speaker, start time and end time of each speaking, and speaker change time (timing), is used as the information showing the speaking situation. In addition, in order to determine the speaking situation related to a specific conversation, only some of the time information regarding the speaking may be used, or other information may be additionally used.

Figure 11:
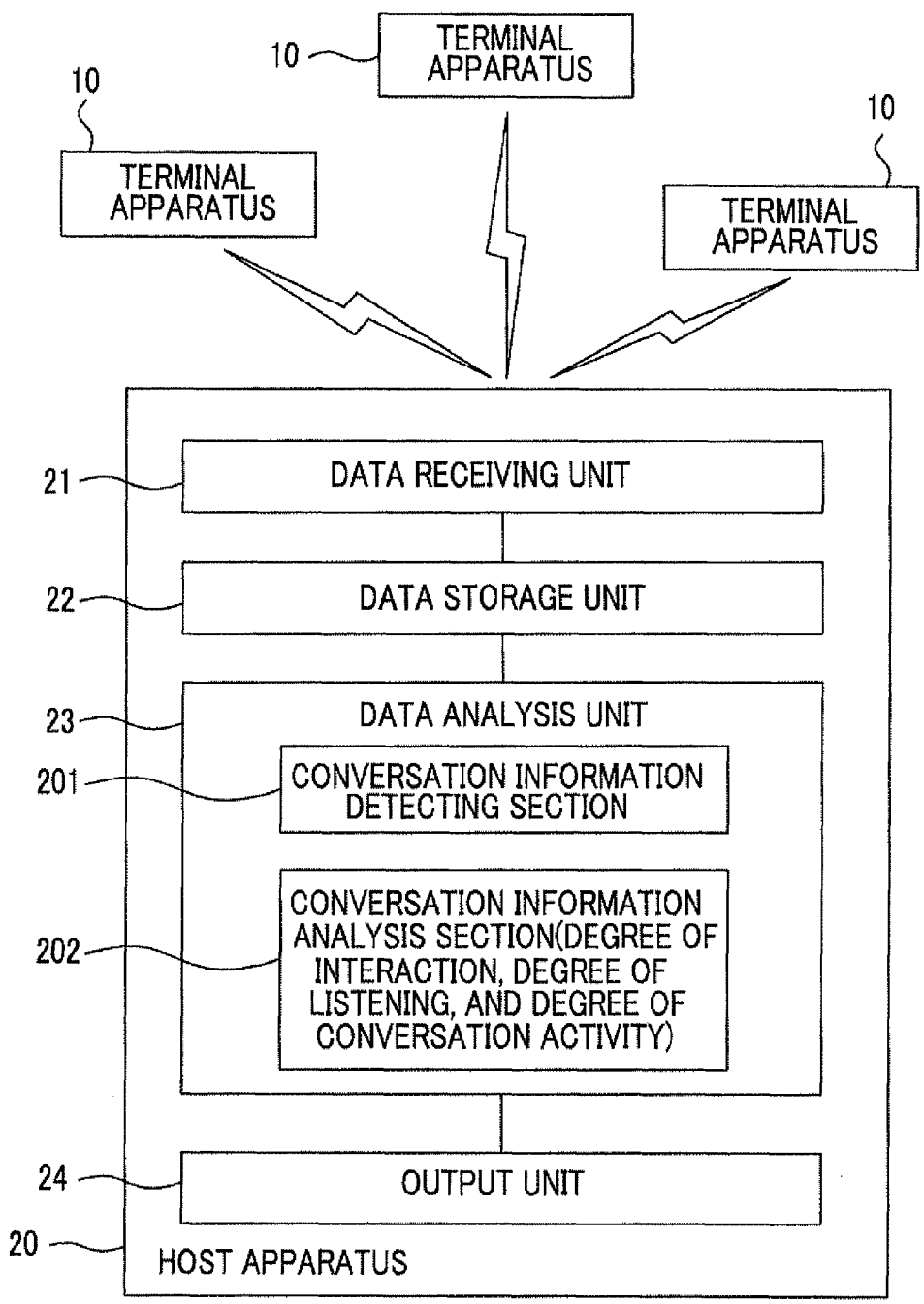
FIG. 11 is a view showing an example of the functional configuration of a host apparatus in an application example.

FIG. 11 is a view showing an example of the functional configuration of the host apparatus 20 in this application example.

In this application example, the host apparatus 20 includes a conversation information detecting section 201 that detects the speaking information (hereinafter, referred to as conversation information) from the terminal apparatus 10 of the wearer in conversation, among the speaking information items acquired from the terminal apparatus 10, and a conversation information analysis section 202 that analyzes the detected conversation information. The conversation information detecting section 201 and the conversation information analysis section 202 are realized as a function of the data analysis unit 23.

Also from the terminal apparatus 10 other than the terminal apparatuses 10A and 10B, the speaking information is transmitted to the host apparatus 20. The speaking information from each terminal apparatus 10 which is received by the data receiving unit 21 is stored in the data storage unit 22. In addition, the conversation information detecting section 201 of the data analysis unit 23 reads the speaking information of each terminal apparatus 10 stored in the data storage unit 22 and detects the conversation information which is the speaking information related to a specific conversation.

As shown in FIG. 10, from the speaking information of the terminal apparatus 10A and the speaking information of the terminal apparatus 10B, the characteristic correspondence relationship which is different from the speaking information of other terminal apparatuses 10 is extracted. The conversation information detecting section 201 compares the speaking information that is acquired from each terminal apparatus 10 and is stored in the data storage unit 22, detects the speaking information with the above-described correspondence relationship from the speaking information acquired from the plural terminal apparatuses 10, and identifies the speaking information as conversation information related to the same conversation. The speaking information from the plural terminal apparatuses 10 is transmitted to the host apparatus 20 when necessary. Accordingly, the conversation information detecting section 201 determines whether or not the conversation information related to the specific conversation is included by performing the above-described processing while sequentially separating the speaking information in a fixed period, for example.

In addition, the conditions required when the conversation information detecting section 201 detects the conversation information related to a specific conversation from the speaking information of the plural terminal apparatuses 10 are not limited to the correspondence relationship shown in FIG. 10 described above. Any detection method may be used as long as it is possible to identify the conversation information related to a specific conversation from plural speaking information items.

In addition, although the case where two wearers each of whom wears the terminal apparatus 10 have a conversation is shown in the above example, the number of persons participating in a conversation is not limited to two persons. When three or more wearers have a conversation, the terminal apparatus 10 worn by each wearer recognizes the voice of the wearer of the host apparatus as the voice of the wearer and distinguishes the voice of the wearer from the voices of others (two or more persons). However, the information showing the speaking situation, such as speaking time or speaker change timing, is similar among the acquired information items in the respective terminal apparatuses 10. Therefore, similar to the case where two persons have a conversation, the conversation information detecting section 201 detects the speaking information acquired from the terminal apparatuses 10 of wearers participating in the same conversation and distinguishes the acquired speaking information from the speaking information acquired from the terminal apparatuses 10 of wearers not participating in the conversation.

Then, the conversation information analysis section 202 analyzes the conversation information detected by the conversation information detecting section 201 and extracts the features of the conversation. In the present exemplary embodiment, as a specific example, the features of the conversation are extracted on the basis of three kinds of criteria for evaluation, that is, the degree of interaction, the degree of listening, and the degree of conversation activity. Here, the degree of interaction is assumed to indicate the balance of the speaking frequency of conversation participant. The degree of listening is assumed to indicate the degree of listening to others in each conversation participant. The degree of conversation activity is assumed to indicate the density of speaking in the entire conversation.

The degree of interaction is specified by the number of times of speaker changes during the conversation and a variation in time taken until the speaker is changed (time for which one speaker speaks continuously). This may be obtained from the number of times of speaker changes and the time when the speaker change occurs in the conversation information in a fixed period. In addition, it is assumed that the value (level) of the degree of interaction increases as the number of times of speaker changes increases, that is, as a variation in continuous speaking time of each speaker decreases. This criterion for evaluation is common in all conversation information items (speaking information of each terminal apparatus 10) related to the same conversation.

The degree of listening is specified by the ratio of speaking time of each conversation participant and speaking time of others in conversation information. For example, in the following expression, it is assumed that the value (level) of the degree of listening increases as the value of speaking time of others increases.

Degree of listening=(speaking time of others)/(speaking time of a wearer)

This criterion for evaluation differs with the speaking information acquired from the terminal apparatus 10 of each conversation participant even in the conversation information related to the same conversation.

The degree of conversation activity is an index showing the so-called excitement of the conversation, and is specified by the ratio of silence time (time for which none of conversation participants speak) to the total conversation time. It is assumed that the value (level) of the degree of conversation activity increases as the total silence time becomes short (which means that any one of conversation participants speaks in the conversation). This criterion for evaluation is common in all conversation information items (speaking information of each terminal apparatus 10) related to the same conversation.

As described above, the features of a conversation related to the conversation information are extracted by the conversation information analysis of the conversation information analysis section 202. In addition, the way of participation of each participant in the conversation is specified by performing the analysis as described above. In addition, the above criteria for evaluation are just examples of information indicating the features of a conversation, and criteria for evaluation according to the purpose or aspect of use of the system of the present exemplary embodiment may be set by adopting other evaluation criteria or giving a weighting to each item.

The tendency of communication in a group to which the wearer of the terminal apparatus 10 belongs may be analyzed by performing the above analysis for various kinds of conversation information detected by the conversation information detecting section 201 among the speaking information items stored in the data storage unit 22. Specifically, the tendencies of conversation in a wearer's group may be determined by checking the number of conversation participants, conversation time, correlation between the values, such as the degree of interaction and the degree of conversation activity, and the occurrence frequency of conversation, for example.

In addition, the communication tendency of each wearer may be analyzed by performing the analysis as described above for plural conversation information items of a specific wearer. The way of participation of a specific wearer in the conversation may have a certain tendency according to the conditions, such as a conversation partner or the number of conversation participants. Therefore, it may be expected that the features, such as "the speaking level increases in a conversation with a specific partner" or "the degree of listening becomes large if the number of conversation participants increases", are detected by checking the plural conversation information items in a specific wearer.

In addition, the speaking information identification processing and the conversation information analysis processing described above just show the application example of the system according to the present exemplary embodiment, and do not limit the purpose or aspect of use of the system according to the present exemplary embodiment, the function of the host apparatus 20, and the like. The processing function for executing various kinds of analyses and examinations for the speaking information acquired by the terminal apparatus 10 according to the present exemplary embodiment may be realized as a function of the host apparatus 20.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A motion analyzer comprising:
   a motion detection unit that detects motion of a part of a body of a subject;
   a first voice acquisition unit that is provided in a place where a distance of a sound wave propagation path from a mouth of the subject is a first distance; and
   a second voice acquisition unit that is provided in a place where a distance of a sound wave propagation path from the mouth of the subject is smaller than the first distance,
   a speaking detection unit that detects speaking of the subject on the basis of a sound pressure ratio is a ratio between sound pressure of a voice acquired by the first voice acquisition unit and sound pressure of a voice acquired by the second voice acquisition unit; and
   a determination unit that determines that the subject has performed predetermined motion when motion of a part of the body is detected by the motion detection unit and speaking of the subject is detected by the speaking detection unit.

2. The motion analyzer according to claim 1,
   wherein the determination unit determines that the subject has performed the predetermined motion when motion of a part of the body is detected by the motion detection unit, speaking of the subject is detected by the speaking detection unit, and a time for which the speaking detected by the speaking detection unit continues is equal to or shorter than a predetermined time.

3. The motion analyzer according to claim 1,
   wherein the determination unit determines that the subject has performed the predetermined motion when motion of a part of the body is detected by the motion detection unit, speaking of the subject is detected by the speaking detection unit, and a time for which the speaking detected by the speaking detection unit continues is equal to or shorter than a predetermined time.

4. A voice acquisition apparatus comprising:
   an apparatus body;
   a strap that is connected to the apparatus body and is used when the apparatus body is hung from a neck of a subject;
   a first voice acquisition unit that is provided in the strap or the apparatus body and that is provided in a place where a distance of a sound wave propagation path from a mouth of the subject, which is a distance when the apparatus body is hung from the neck of the subject, is a first distance;
   a second voice acquisition unit that is provided in the strap and that is provided in a place where a distance of a sound wave propagation path from the mouth of the subject, which is a distance when the apparatus body is hung from the neck of the subject, is smaller than the first distance; and
   a motion detection unit that is provided in the strap and that detects motion of a part of a body of the subject.

5. The voice acquisition apparatus according to claim 4,
   wherein the motion detection unit is attached to the strap so as to be located behind the neck when the apparatus body is lowered from the neck of the subject, and detects motion of the neck of the subject.

6. The voice acquisition apparatus according to claim 4, further comprising:
   an identification unit that identifies whether voices acquired by the first and second voice acquisition units are a voice of the subject or voices of others on the basis of a comparison result of a voice signal of the voice acquired by the first voice acquisition unit and a voice signal of the voice acquired by the second voice acquisition unit; and
   a signal transmission unit that is provided in the apparatus body and transmits information regarding the voice signals, which includes an identification result of the identification unit, and a detection result of the motion detection unit to an external device.

7. The voice acquisition apparatus according to claim 5, further comprising:
   an identification unit that identifies whether voices acquired by the first and second voice acquisition units are a voice of the subject or voices of others on the basis of a comparison result of a voice signal of the voice acquired by the first voice acquisition unit and a voice signal of the voice acquired by the second voice acquisition unit; and
   a signal transmission unit that is provided in the apparatus body and transmits information regarding the voice signals, which includes an identification result of the identification unit, and a detection result of the motion detection unit to an external device.

8. A motion analysis system comprising:
   a terminal apparatus that is worn on a subject; and
   a host apparatus that acquires information from the terminal apparatus,
   wherein the terminal apparatus includes:
      a motion detection unit that detects motion of a part of a body of the subject;
      a voice acquisition unit that acquires a voice, the voice acquisition unit comprises:
         a first voice acquisition unit that is provided in a place where a distance of a sound wave propagation path from a mouth of the subject is a first distance;
         a second voice acquisition unit that is provided in a place where a distance of a sound wave propagation path from the mouth of the subject is smaller than the first distance; and
      a speaking detection unit that detects speaking of the subject on the basis of a sound pressure ratio which is a ratio between sound pressure of a voice acquired by the on unit and sound pressure of a voice acquired by the second voice acquisition unit;

an identification unit that identifies whether a voice acquired by the voice acquisition unit is a voice of the subject or voices of others; and a signal transmission unit that transmits speaking information that is information regarding a voice signal, which includes an identification result of the identification unit, and a detection result of the motion detection unit to the host apparatus, and the host apparatus includes:

a signal receiving unit that receives the speaking information and the detection result transmitted from the terminal apparatus; and a determination unit that determines whether or not the subject has performed predetermined motion on the basis of the speaking information and the detection result received by the signal receiving unit.

9. The motion analysis system according to claim 8, wherein the determination unit of the host apparatus determines whether or not an output satisfying predetermined conditions is included in the detection result transmitted from the terminal apparatus and checks time information of the output when it is determined that an output satisfying the predetermined conditions is included, checks time information when the subject emits the voice when an identification result indicating that the voice acquired by the voice acquisition unit is a voice of the subject is transmitted from the terminal apparatus, and determines that the subject has performed the predetermined motion when a point of time when the output satisfying the predetermined conditions is made and a point of time when the subject emits the voice have a predetermined relationship.

10. A motion analysis method comprising:

detecting motion of a part of a body of a subject;

providing a first voice acquisition unit that is provided in a place where a distance of a sound wave propagation path from a mouth of the subject is a first distance;

providing a second voice acquisition unit that is provided in a place where a distance of a sound wave propagation path from the mouth of the subject is smaller than the first distance, detecting speaking of the subject on the basis of a sound pressure ratio which is a ratio between sound pressure of a voice acquired by the first voice acquisition unit and sound pressure of a voice acquired by the second voice acquisition unit;

determining that the subject has performed predetermined motion when motion of a part of the body is detected in the detecting step of the motion and speaking of the subject is detected in the detecting step of the speaking.

* * * * *